(12) United States Patent
Li et al.

(10) Patent No.: US 7,924,992 B2
(45) Date of Patent: Apr. 12, 2011

(54) METHOD OF ENSURING CALL PROCESSING FOR INTELLIGENT USER

(75) Inventors: Shiqian Li, Guangdong (CN); Tianjun Yan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 840 days.

(21) Appl. No.: 11/867,021

(22) Filed: Oct. 4, 2007

(65) Prior Publication Data

US 2008/0043979 A1 Feb. 21, 2008

Related U.S. Application Data

(63) Continuation of application No. PCT/CN2005/002141, filed on Dec. 9, 2005.

(30) Foreign Application Priority Data

Apr. 22, 2005 (CN) .......................... 2005 1 0066332

(51) Int. Cl.
*H04M 15/00* (2006.01)

(52) U.S. Cl. ......... 379/114.05; 379/114.01; 379/114.28; 379/126; 379/221.08; 379/221.09; 379/221.12

(58) Field of Classification Search .................. 379/230, 379/211.09, 221.08, 207.02, 221.12, 114.01, 379/114.05, 114.28, 114.29, 126, 221.01, 379/221.09

See application file for complete search history.

(56) References Cited

U.S. PATENT DOCUMENTS

| 5,475,737 | A | * | 12/1995 | Garner et al. | ............... | 379/88.26 |
| 5,912,954 | A | * | 6/1999 | Whited et al. | ........... | 379/114.29 |
| 6,366,655 | B1 | | 4/2002 | Book et al. | | |
| 2001/0040951 | A1 | | 11/2001 | Lautenschlager et al. | | |
| 2003/0165228 | A1 | * | 9/2003 | Goldman et al. | ........ | 379/221.08 |

(Continued)

FOREIGN PATENT DOCUMENTS

CN 1340956 A 3/2002

(Continued)

OTHER PUBLICATIONS

Foreign communication from a counterpart application—PCT application PCT/CN2005/002141, English translation of Preliminary Report on Patentability, Oct. 23, 2007, 8 pages.

(Continued)

*Primary Examiner* — Ahmad F Matar
*Assistant Examiner* — Antim Shah
(74) *Attorney, Agent, or Firm* — Conley Rose, P.C.; Grant Rodolph

(57) ABSTRACT

A method of ensuring call processing for an intelligent user, including: upon receiving a call, judging, by a first Service Switching Point (SSP), whether traffic between the first SSP and a Service Control Point (SCP) is abnormal; if the traffic is abnormal, turning off, by the first SSP, intelligent triggers located in itself and related to the call, and performing an ordinary call connection; otherwise, performing an intelligent call connection, and terminating the process. In the embodiments of the present invention, normal communications can be ensured between intelligent users, even if the traffic between the SSP and the SCP is abnormal. In addition, when the SSP detects that the traffic between the SSP and the SCP is abnormal, the SSP may firstly judge whether to continue the call connection, according to relations among intelligent user identities, reasons for abnormality and whether to perform call connection set in advance, instead of blindly performing call connections for all the intelligent users, thereby preventing excessive service load on the SSP.

18 Claims, 3 Drawing Sheets

U.S. PATENT DOCUMENTS

2004/0166878 A1 * 8/2004 Erskine et al. ............ 455/456.1

FOREIGN PATENT DOCUMENTS

| CN | 1585450 A | 2/2005 |
|---|---|---|
| EP | 0886448 A2 | 12/1998 |

OTHER PUBLICATIONS

Foreign communication from a counterpart application—European application 05818807.9, Office Action dated Apr. 20, 2009, 4 pages.

Foreign communication from a counterpart application—Russian application 2007140674/09(044522), Office Action dated Dec. 5, 2008, 3 pages.

Foreign communication from a counterpart application—Russian application 2007140674/09(044522), English Summary of Dec. 5, 2008 office action, Jan. 8, 2009, 2 pages.

Foreign communication from a counterpart application—Russian application 2007140674/09(044522), English Comments on Office Action dated Dec. 5, 2008, 4 pages.

* cited by examiner

METHOD OF ENSURING CALL PROCESSING FOR INTELLIGENT USER

FIELD OF THE INVENTION

The present invention relates to mobile communication technologies, and more particularly, to a method of ensuring a call for an intelligent user when traffic between a Service Switching Point (SSP) and a Service Control Point (SCP) is abnormal.

BACKGROUND OF THE INVENTION

Along with the continuous development of intelligent services, the number of intelligent users rises continuously. To this end, how to ensure normal calls for intelligent users becomes a matter which may influence the quality of service.

FIG. 1 is a flowchart of originating a call from a prepaid user. As shown in FIG. 1, suppose that the prepaid user is an intelligent user, the specific process of setting up a connection to ensure a call for the prepaid user in the prior art includes the following steps:

Step 101: an originating SSP receives a call from a calling prepaid user, and detects an intelligent trigger named Origination_Attempt_Authorized.

Step 102: the originating SSP sends an ORREQ message to a corresponding SCP according to the address identified in the trigger.

Step 103: upon receiving the ORREQ message, the SCP checks the account balance of the calling prepaid user; if the account balance exceeds a preset limit, proceed to Step 105; otherwise, proceed to Step 104.

Step 104: the SCP returns an orreq message, carrying in the message parameters ACCEDN and ANNLIST to notify the originating SSP that call processing shall be refused, and then terminates the process.

Step 105: the SCP returns an orreq message, carrying in the message a parameter DMH_SVCIDLIST to notify the originating SSP that call processing shall continue.

Step 106: the originating SSP detects an intelligent trigger Calling_Routing_address_Available, and sends an ANLYZD message to a corresponding SCP according to the address identified in the trigger.

Step 107: upon receiving the ANLYZD message, the SCP judges whether the account balance of the user is sufficient to initiate the call; if the account balance is sufficient, proceed to Step 108; otherwise, the SCP notifies the originating SSP to interrupt the call, and terminates the process.

Step 108: the SCP notifies the originating SSP to continue the call, and the originating SSP establishes a connection from the calling user to the called user. Then, the calling user may communicate with the called user after receiving a response from the called user.

It can be seen from the above process that the SCP is a core unit of the entire intelligent network for an intelligent service. When an intelligent call arrives, the SCP will send a series of operating instructions to the SSP, instructing the SSP to perform operations according to the established service logics, and the SSP can not independently implement the whole process of intelligent call by itself.

In practical implementation of intelligent services, however, abnormal situations may occur between the SSP and the SCP. For example, failures such as disconnection or congestion of a link between the SSP and the SCP may occur, which disables message interaction between the SSP and the SCP. For another example, the SCP, which is busy or in failure, can not send operation instructions to the SSP. Thus, when abnormal situations occur between the SSP and the SCP, the SSP can not acquire the operation instruction from the SCP, and therefore can not perform corresponding operation, which makes call proceeding of intelligent users impossible, and hinders normal operations of intelligent services.

SUMMARY

An embodiment of the present invention is to provide a method of ensuring call for an intelligent user such that the SSP can implement the intelligent call in the case when the traffic between the SSP and the SCP becomes abnormal.

The technical solution in accordance with the present invention is achieved as follows.

A method of ensuring call processing for intelligent user, including:

judging, by a first Service Switching Point (SSP), whether traffic between the first SSP and a Service Control Point (SCP) is abnormal;

if the traffic is normal, performing an intelligent call connection;

if the traffic is abnormal, turning off, by the first SSP, intelligent triggers located in the first SSP and related to the call, and performing an ordinary call connection.

It can be seen that the method provided in the embodiment of the present invention has the following advantageous:

In an embodiment of the present invention, when an SSP detects, during the interaction with an SCP, that the traffic between the SSP and the SCP is abnormal, the SSP will turn off all intelligent triggers involved in the call, and take this call as an ordinary call rather than an intelligent call. Then, no more messages will be sent to the SCP, and the SSP will continue the call processing without instructions from the SCP. That is to say, even if the traffic between the SSP and the SCP is abnormal, normal communications can still be ensured between intelligent users in accordance with the present invention.

EMBODIMENTS OF THE INVENTION

Figure 1:
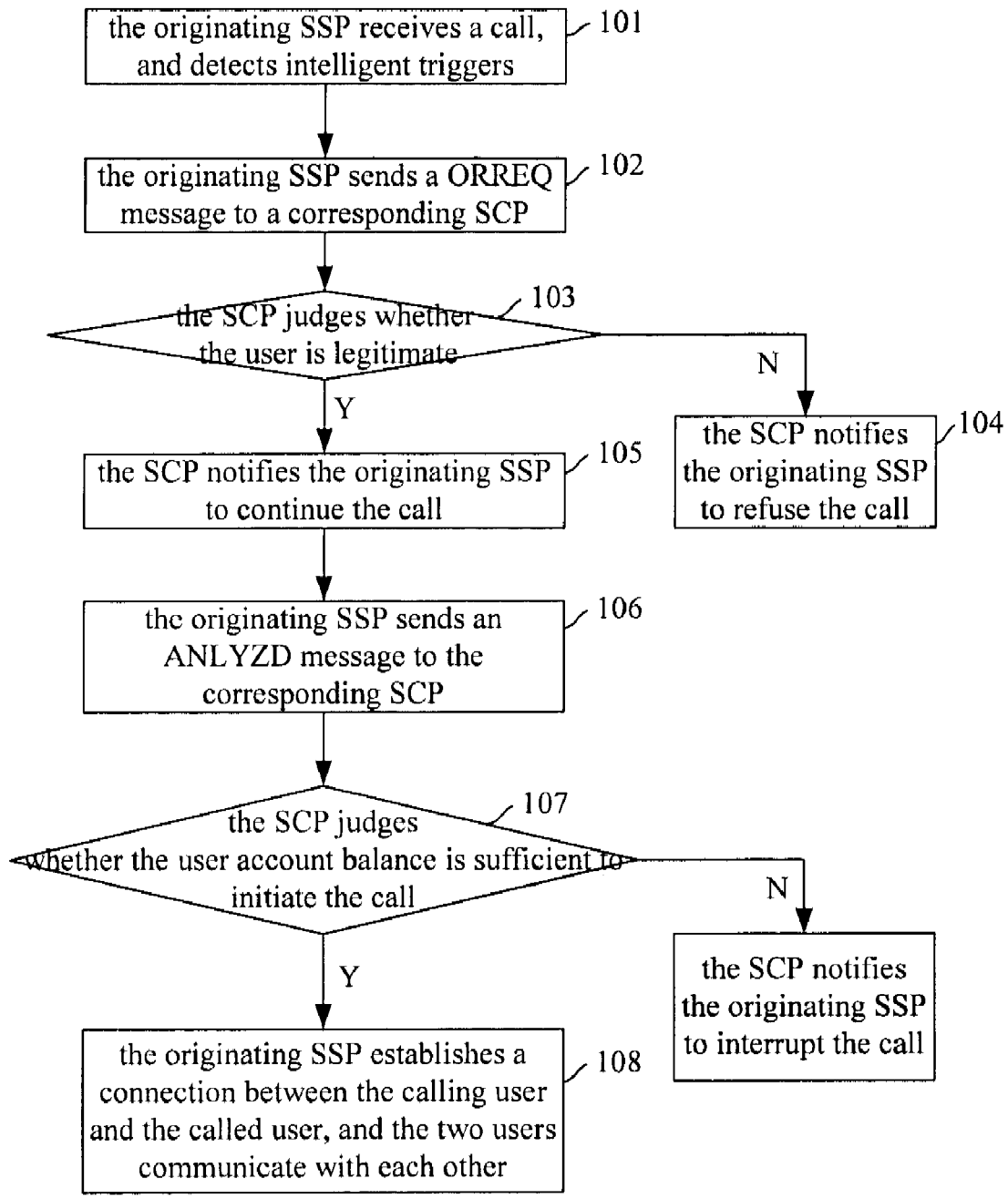
FIG. 1 is a flowchart of originating a call from a prepaid user in accordance with the prior art.

In the prior art, an SSP has to implement call connection procedures for intelligent users following a series of instructions issued by an SCP. Therefore, if some abnormal situations occur between the SSP and the SCP, the call processing of the intelligent user can not be guaranteed. In view of the above, the embodiment of the present invention provides a method of ensuring a call for an intelligent user. When the SSP detects that the traffic between the SSP and the SCP is abnormal, the SSP turns off all the intelligent triggers associated with the call, sends no more messages to the SCP, and continues with the call connection procedure without the instruction from the SCP, i.e., the call is handled as an ordinary call other than an intelligent call. Furthermore, if the call is associated with a plurality of SSPs, any one of the associated SSPs which has detected the abnormal situation will notify a subsequent associated SSP to handle the call as an ordinary call.

In practical implementation of a service, if an SSP has to ensure call processing for all intelligent users, service load of the SSP will increase greatly. Therefore, in a preferred embodiment of the present invention, relations among intelligent user identities, reasons for abnormality and whether to perform call connection are set in advance. When the SSP attempts to communicate with the SCP but detects that traffic between the SSP and the SCP is abnormal, the SSP may firstly acquire the intelligent user identity and the reason for abnormality, and judge whether the intelligent user is permitted to continue with the call connection procedure in this abnormal situation according to the corresponding relation set in advance; if yes, the SSP turns off all the intelligent triggers located in itself and performs the call connection; otherwise, the call connection procedure will no longer be continued, that is, the call is interrupted.

In some other embodiments, the SSP may determine whether to continue the call connection merely according to the intelligent user identity, or according to both the intelligent user identity and the reason for abnormality.

Here, the intelligent user identity may be a number i.e. Mobile Directory Number (MDN) of the user, an International Mobile Subscriber Identity (IMSI) of the user, a Mobile Identification Number (MIN) of the user or an Electronic Serial Number (ESN) of the user, a number range to which the user belongs, a priority level of the intelligent user, an address of the SCP to which the intelligent user belongs, or a trigger list of the intelligent user, etc. For example, when the intelligent user identity is a trigger list, the SSP may determine according to the trigger list whether the user is an intelligent user permitted to perform the call connection. For another example, when the intelligent user identity is a priority level of the intelligent user, the SSP may determine according to the priority level whether the intelligent user with the priority level is permitted to perform the call connection.

In an embodiment of the present invention, an intelligent user identity is a priority level of the intelligent user.

Figure 2:
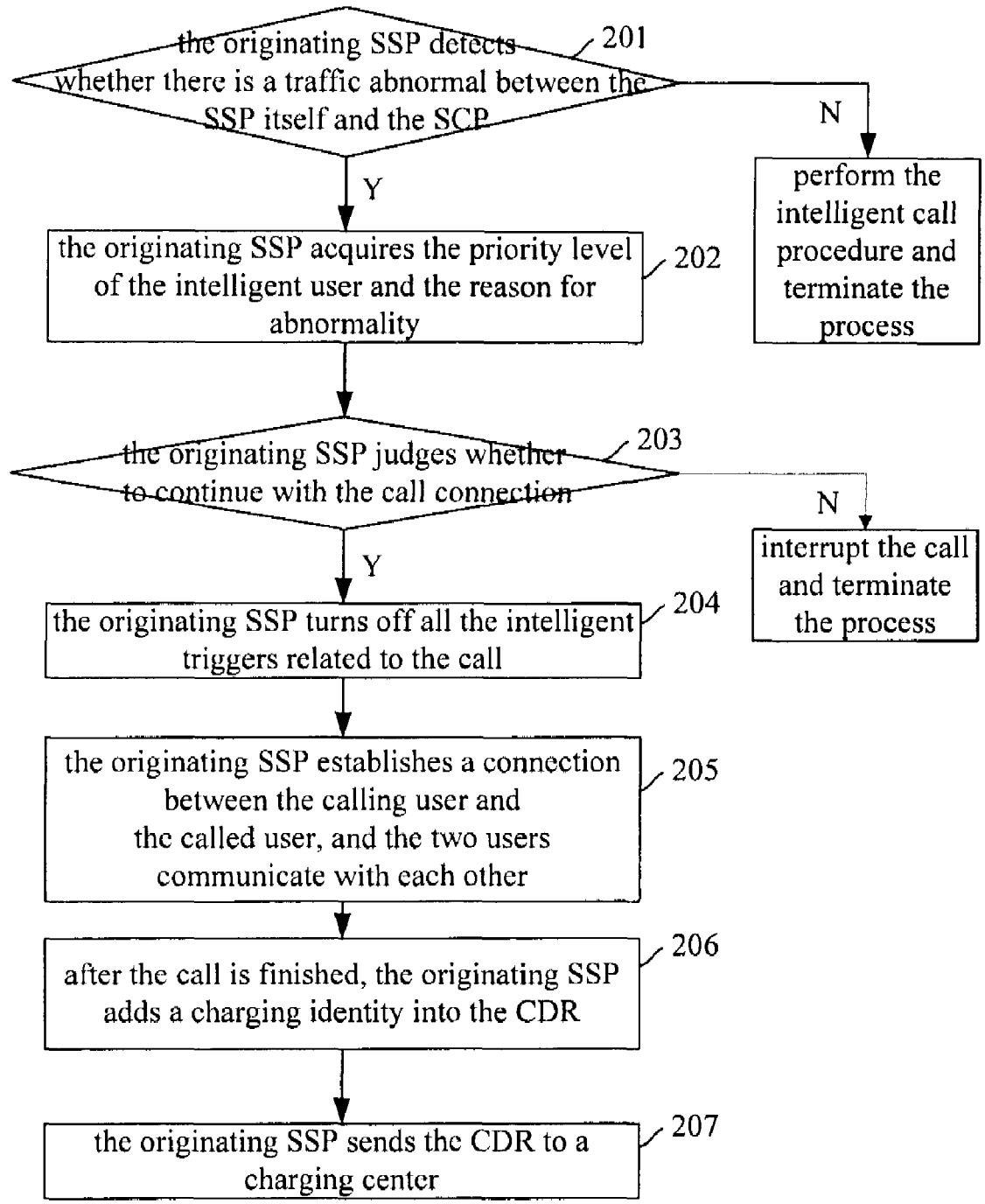
FIG. 2 is a flowchart of originating a call from a calling intelligent user in accordance with an embodiment of the present invention.

FIG. 2 is a flowchart of originating a call from a calling intelligent user in accordance with the embodiment of the present invention. Referring to FIG. 2, the process of originating a call by an intelligent user includes the following steps:

Step 201: an originating SSP receives a call from a calling intelligent user, and determines whether an abnormal traffic appears between the SSP and the SCP; if yes, proceed to Step 202; otherwise, perform the intelligent call connection in the prior art.

Since the originating SSP has to communicate with the SCP, the originating SSP may firstly detect, when receiving a call from an intelligent user, whether the traffic between the SSP itself and the SCP is abnormal. The detecting process is a prior art, and no more descriptions are given here. For example, an abnormal situation may be that the originating SSP has not received a response message from the SCP for a preset period of time.

Step 202: the originating SSP acquires the priority level of the intelligent user and the reason for abnormality.

The originating SSP acquires the priority level of the intelligent user from user information saved in itself, and determines the reason for abnormality according to the error reason value reported from the bottom layer or returned by the SCP.

Step 203: the originating SSP judges whether to continue the call connection; if yes, proceed to Step 204; otherwise, interrupt the call, and finish the process.

Based on relations set in advance among priority levels of intelligent users, reasons for abnormality and whether to perform call connection, the originating SSP judges whether to continue the call connection for the intelligent user, i.e., whether to perform the intelligent call connection, according to the reason for abnormality of the call. For example, the relations set in advance in the originating SSP may include: as to a postpaid user of higher priority, such as Globe System of Mobile (GSM) user or CDMA user, performing the call connection irrespective of any reason for abnormality between the originating SSP and the SCP; as to a prepaid user of lower priority, not performing the call connection in the case that the reason for abnormality is that a link is disconnected, and performing the call connection in the case that the reason for abnormality is that a link is congested or a signaling point is failed. Thus, if the intelligent user of the call is a GSM user and the reason for abnormality is that the link is disconnected, the originating SSP will perform the call connection; if the intelligent user of the call is a prepaid user and the reason for abnormality is that the link is disconnected, the originating SSP will not perform the call connection.

Step 204: the originating SSP turns off all the intelligent triggers involved in the call.

The originating SSP will not send any message related to the call to the SCP after all the intelligent triggers in the SSP, which are related to the call, are turned off. Moreover, the originating SSP may continue with the call connection procedure without instructions from the SCP, in other words, the originating SSP takes the call as an ordinary call other than an intelligent call.

Step 205: the originating SSP sets up a connection from the calling user to the called user, and after the called user responds, the calling user may communicate with the called user.

Step 206: the originating SSP adds a charging identity into the CDR generated by the originating SSP itself after the call is finished.

The added charging identity is used to indicate that the user of the call is an intelligent user, and the SCP has not charge the intelligent user for the call yet.

Step 207: the originating SSP sends the CDR to a charging center.

In an embodiment of the present invention, since the intelligent triggers located in the SSP are turned off, the SSP may not send messages related to the call to the SCP to which the intelligent user belongs, so that the SCP to which the intelligent user belongs does not charge the intelligent user for the call. Accordingly, in another embodiment of the embodiment of the present invention, a charging identity can be further added into the CDR generated by the SSP to indicate that the call of the intelligent user is normal but the SCP to which the intelligent user belongs does not charge the user, and then the charging center may perform charging according to the CDR, thereby not only ensuring the normal call but also ensuring the normal charging of the intelligent user.

Figure 3:
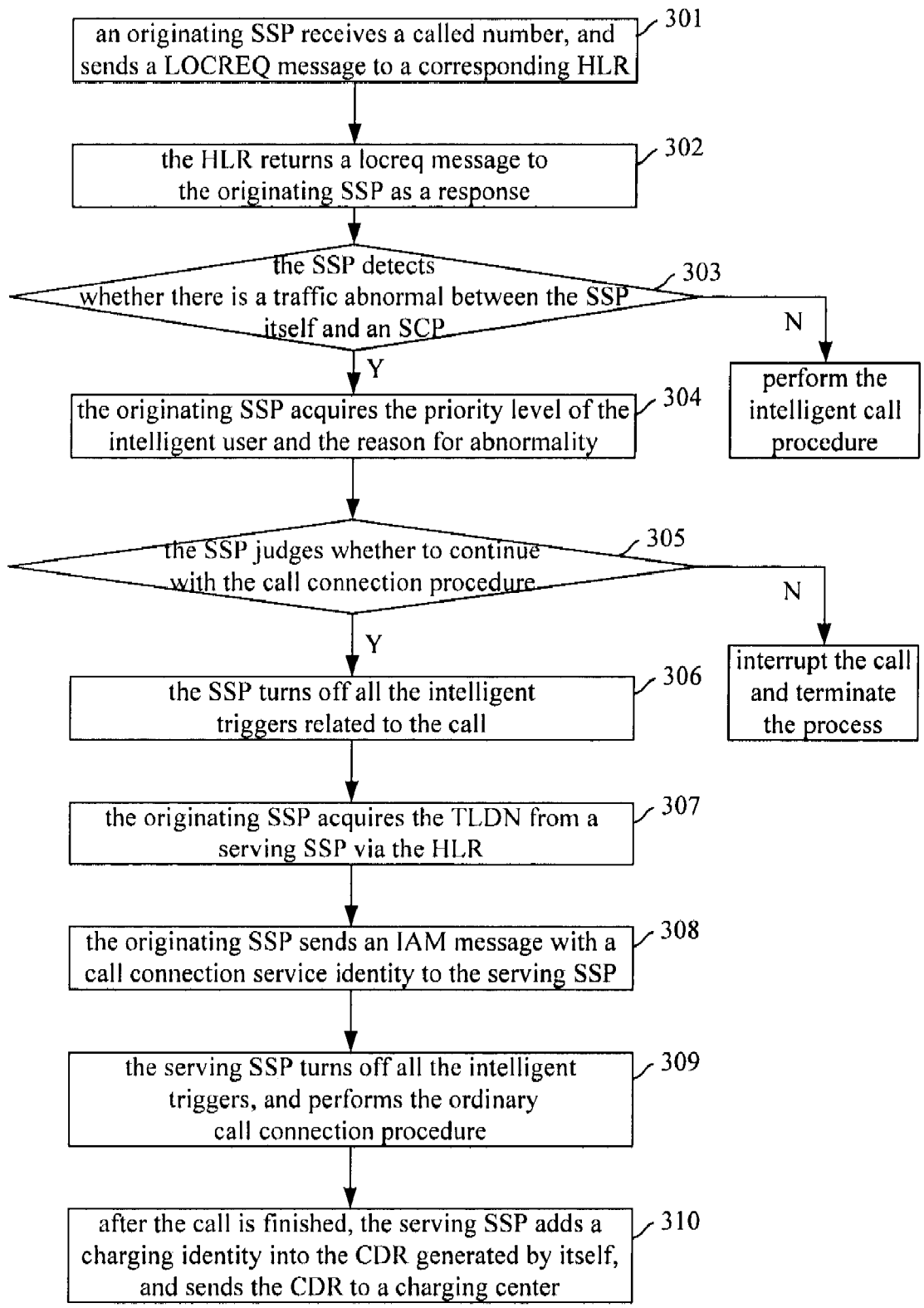
FIG. 3 is a flowchart of implementing an inter-office call for the called user in accordance with an embodiment of the present invention.

FIG. 3 is a flowchart of implementing an inter-office call for the called user in an embodiment of the present invention. Referring to FIG. 3, for the inter-office call of an intelligent user, the process of ensuring the call processing includes the following steps:

Step 301: a user originates a call, an originating SSP receives the called number and detects an intelligent trigger Mobile_Termination. Then, the originating SSP sends a LOCREQ message to a Home Location Register (HLR) according to the address identified in the trigger.

Step 302: the HLR returns a locreq message as a response to the originating SSP upon receiving the LOCREQ message.

Step 303: the originating SSP determines, upon receiving a locreq message, whether the traffic between the SSP and an SCP is abnormal; if yes, proceed to Step 304; otherwise, perform the intelligent call connection and terminate the process.

After receiving the locreq message from the HLR, the originating SSP communicates with the SCP in order to detect whether there is a traffic abnormal between the SSP itself and the SCP.

Step 304: the originating SSP acquires the priority level of the intelligent user and the reason for abnormality.

The originating SSP acquires the priority level of the intelligent user from user information saved in itself, and acquires the reason for abnormality according to the error reason value reported from the bottom layer or returned by the SCP.

Step 305: the originating SSP judges whether to continue with the call connection procedure; if yes, proceed to Step 306; otherwise, interrupt the call, and terminate the process.

The originating SSP judges whether to continue with the call connection procedure, according to the corresponding relation set in advance in the SSP among the priority level of the intelligent user, the reason for abnormality and whether to perform the call connection.

Step 306: the originating SSP turns off all the intelligent triggers located in itself, which are related to the call.

Since all the intelligent triggers related to the call are turned off in the SSP, the SSP will not send any message related to the call to the SCP, and the call connection procedure will be continued without instructions from the SCP. That is to say, the originating SSP can take the call as an ordinary call other than an intelligent call.

Step 307: the originating SSP acquires the called Temporary Local Directory Number (TLDN) from the serving SSP of the called user via the HLR.

Step 308; the originating SSP sends an IAM message containing a call connection service identity to the serving SSP.

Since the originating SSP and the serving SSP are both associated SSPs of the call, the originating SSP shall notify subsequent serving SSPs to handle the call as an ordinary call. A call connection service identity is contained in an IAM message, and the IAM message is sent to the serving SSP by the originating SSP so as to notify the serving SSP to handle the call as an ordinary call. The call connection service identity may be a call connection prefix added before the called number or calling number or other cells of the IAM message.

In addition, the originating SSP uses the IAM message in the ISUP signaling to notify the serving SSP to handle the call as an ordinary call. Moreover, the originating SSP can use a message of other trunk signaling, such as an IAI message in the TUP signaling, or a SETUP message in the PRA signaling, to notify the serving SSP.

Step 309: the serving SSP receives the IAM message, and if learning that the call needs to be handled as an ordinary call according to the call connection service identity in the IAM message, the serving SSP turns off all the triggers located in itself, which are related to the call, and performs the ordinary call connection.

Step 310: the serving SSP adds a charging identity into the CDR generated by the SSP, and sends the CDR to a charging center.

Here, the added charging identity is used for indicating that the call processing of the intelligent user is normal but the SCP to which the intelligent user belongs does not charge the user, and the charging center may charge the user according to the CDR.

When the intelligent user initiates a three-party call or conference call or CALL HOLD or CALL WAIT, that is, when the SSP needs to perform a plurality of call connection procedures for one intelligent user, the present invention can be applied to each call independently. For example, an intelligent user A initiates a three-party call, i.e., simultaneously calls an intelligent user B and an intelligent user C. When the intelligent user A calls the intelligent user B, if the link between the SSP and the SCP is disconnected, the SSP will no longer communicate with the SCP for the call of the intelligent user A, but judge whether to perform the subsequent call connection for the intelligent user A to the intelligent user B according to the acquired priority level of the intelligent user A, the reason for abnormality, namely the link is failed, and the corresponding relation set in advance. Meanwhile, in the process that the intelligent user A calls the intelligent user C, if the link becomes normal when the SSP needs to communicate with the SCP, the SSP may perform the intelligent call connection for the intelligent user A to the intelligent user C according to the instruction from the SCP. After the three-party call ends, the SSP learns, from the generated CDR, that the link is failed in the process that the intelligent user A calls the intelligent user B and the SCP to which the intelligent user A belongs does not charge the user for the call.

In the above embodiments, the intelligent user identity is a priority level of the intelligent user. When the intelligent user identity is a number of the intelligent user, the SSP judges whether to perform the call connection for the intelligent user according to the acquired reason for abnormality, the number of the intelligent user, and the corresponding relation set in advance. When the intelligent user identity is an address of the SCP to which the intelligent user belongs, in accordance with the embodiments of the present invention, the SSP judges whether to perform the call connection for the intelligent user according to the acquired reason for abnormality, the address of the SCP namely the SCP to which the intelligent user belongs, and the corresponding relation set in advance. The principle of the specific implementation is the same as the principle of the above process.

It is clear that, in an embodiment of the present invention, relations among intelligent user identities, reasons for abnormality and whether to perform call connection are set in advance. When the SSP attempts to communicate with the SCP but detects that the traffic between the SSP and the SCP is abnormal, the SSP may firstly judge whether to continue the call connection according to the corresponding relation set in advance instead of blindly performing call connections for all the intelligent users, thereby preventing excessive service load on the SSP.

In an embodiment of the present invention, the SSP adds a charging identity into the Call Detail Record (CDR) generated by itself to indicate that the call of an intelligent user is normal, but the SCP to which the intelligent user belongs does not charge the user for the call, thereby not only ensuring normal calls, but further ensuring normal charging, which safeguards the interests of both intelligent users and operators.

The foregoing descriptions are only preferred embodiments of the present invention and are not for use in limiting the present invention. Any modification, equivalent replacement or improvement made under the spirit and principles of the present invention should be included in the protection scope of the present invention.

The invention claimed is:

1. A method of ensuring call processing for an intelligent user, comprising:
   judging, by a first Service Switching Point (SSP), whether traffic between the first SSP and a Service Control Point (SCP) is abnormal;
   if the traffic is normal, performing an intelligent call connection;
   if the traffic is abnormal, turning off, by the first SSP, intelligent triggers located in the first SSP and related to the call, and performing an ordinary call connection other than an intelligent call connection;
   adding a charging identity into a Call Detail Record (CDR) generated at the first SSP; and
   sending the CDR to a charging center, wherein the charging identity indicates that the call of the intelligent user is normal but the SCP to which the intelligent user belongs has not charged the user.

2. The method of claim 1, wherein the judging comprises:
   judging whether the traffic between the first SSP and the SCP is abnormal when the first SSP conducts message interaction with the SCP.

3. The method of claim 1, further comprising: setting, in the first SSP, relations among intelligent user identities, reasons for abnormality and whether to perform an ordinary call connection; and
   after the first SSP determines that the traffic between the first SSP and the SCP is abnormal, acquiring, by the first SSP, an intelligent user identity and a reason for abnormality, and judging whether to perform the ordinary call connection for the intelligent user according to a relation among intelligent user identities, reasons for abnormality and whether to perform an ordinary call connection set in advance; if yes, performing the ordinary call connection; otherwise, terminating the process.

4. The method of claim 1, further comprising:
   acquiring, by the first SSP, an intelligent user identity and a reason for abnormality, and judging whether to perform the ordinary call connection for a user with the intelligent user identity when the reason for abnormality occurs; if yes, performing the ordinary call connection; otherwise, terminating the process.

5. The method of claim 1, further comprising:
   acquiring, by the first SSP, an intelligent user identity, and judging whether to perform the ordinary call connection for a user with the intelligent user identity; if yes, performing the ordinary call connection; otherwise, terminating the process.

6. The method of claim 3, wherein the intelligent user identity comprises a Mobile Directory Number of the user, an International Mobile Subscriber Identity of the user, a Mobile Identification Number of the user, an Electronic Serial Number of the user, a number range to which the intelligent user belongs, a priority level of the intelligent user, an SCP address to which the intelligent user belongs, or a trigger list of the intelligent user.

7. The method of claim 1, wherein the call is associated with a plurality of SSPs, and the first SSP is not a last SSP associated with the call; and
   wherein the method further comprises:
   notifying, by the first SSP, subsequent associated SSPs that the call is to be handled as an ordinary call; and
   turning off, by each of the subsequent associated SSPs, the intelligent triggers located in the each of the subsequent associated SSPs itself and related to the call, and performing an ordinary call connection.

8. The method of claim 7, wherein the call is an inter-office call of the called user, and the first SSP is an originating SSP; and
   wherein notifying the subsequent associated SSPs by the first SSP, comprises: sending, by the first SSP, a message to a serving SSP, carrying in the message a call connection service identity indicating that the call is to be handled as an ordinary call.

9. The method of claim 8, wherein the message sent by the first SSP to a serving SSP is an initial address message (IAM) or an initial address message with additional information (IAI) or a call setup (SETUP) message.

10. The method of claim 8, wherein the carrying in the message the call connection service identity comprises: adding, into the message, a call connection service prefix before a called number or calling number or other cells of the message.

11. The method of claim 1, wherein the intelligent user has initiated the call and initiates another call at the same time; and
    wherein the method further comprises:
    judging, by the first SSP, whether the traffic between the first SSP and the SCP is abnormal when setting up a call connection for another call initiated by the intelligent user which has initiated the call; if yes, turning off intelligent triggers located in the first SSP and related to the another call, and performing an ordinary call connection; otherwise, performing an intelligent call connection.

12. The method of claim 11, wherein the call is one of three-party calls or conference calls or CALL HOLD or CALL WAIT for intelligent services.

13. A Service Switching Point (SSP), comprising at least one component configured to:
    receive a call and judge whether traffic between the SSP and a Service Control Point (SCP) is abnormal, and turn off intelligent triggers related to the call and perform an ordinary call connection if the traffic is abnormal;
    add a charging identity into a Call Detail Record (CDR); and
    send the CDR to a charging center, wherein the charging identity indicates that the call of the intelligent user is normal but the SCP to which the intelligent user belongs has not charged the user.

14. The SSP of claim 13, wherein the at least one component is further configured to:
    set relations among intelligent user identities, reasons for abnormality and whether to perform an ordinary call connection, acquire the intelligent user identity and the reason for abnormality, and judge whether to perform the ordinary call connection for the intelligent user according to the relations among intelligent user identities, reasons for abnormality and whether to perform an ordinary call connection set in advance.

15. The SSP of claim 13, wherein the at least one component is further configured to:
    acquire the intelligent user identity and the reason for abnormality, and judge whether to perform the ordinary call connection for a user with the intelligent user identity when the reason for abnormality occurs.

16. The SSP of claim 13, wherein the at least one component is further configured to:
    acquire the intelligent user identity, and judge whether to perform the ordinary call connection for a user with the intelligent user identity.

17. The SSP of claim 13, wherein the at least one component is further configured to:
   notify subsequent SSPs associated with the call that the call is to be handled as an ordinary call.

18. A system of ensuring call processing for an intelligent user, comprising:
   a Service Control Point (SCP), configured to conduct message interaction with a Service Switching Point;
   wherein the Service Switching Point (SSP), configured to receive a call and judge whether traffic between the SSP and the SCP is abnormal, and turn off intelligent triggers related to the call and perform an ordinary call connection if the traffic is abnormal;
   add a charging identity into a Call Detail Record (CDR); and
   send the CDR to a charging center, wherein the charging identity indicates that the call of the intelligent user is normal but the SCP to which the intelligent user belongs has not charged the user.

* * * * *